A. BARNEDT & G. FLOWER.
SACK JIGGER.
APPLICATION FILED JULY 29, 1916.
1,207,835.
Patented Dec. 12, 1916.
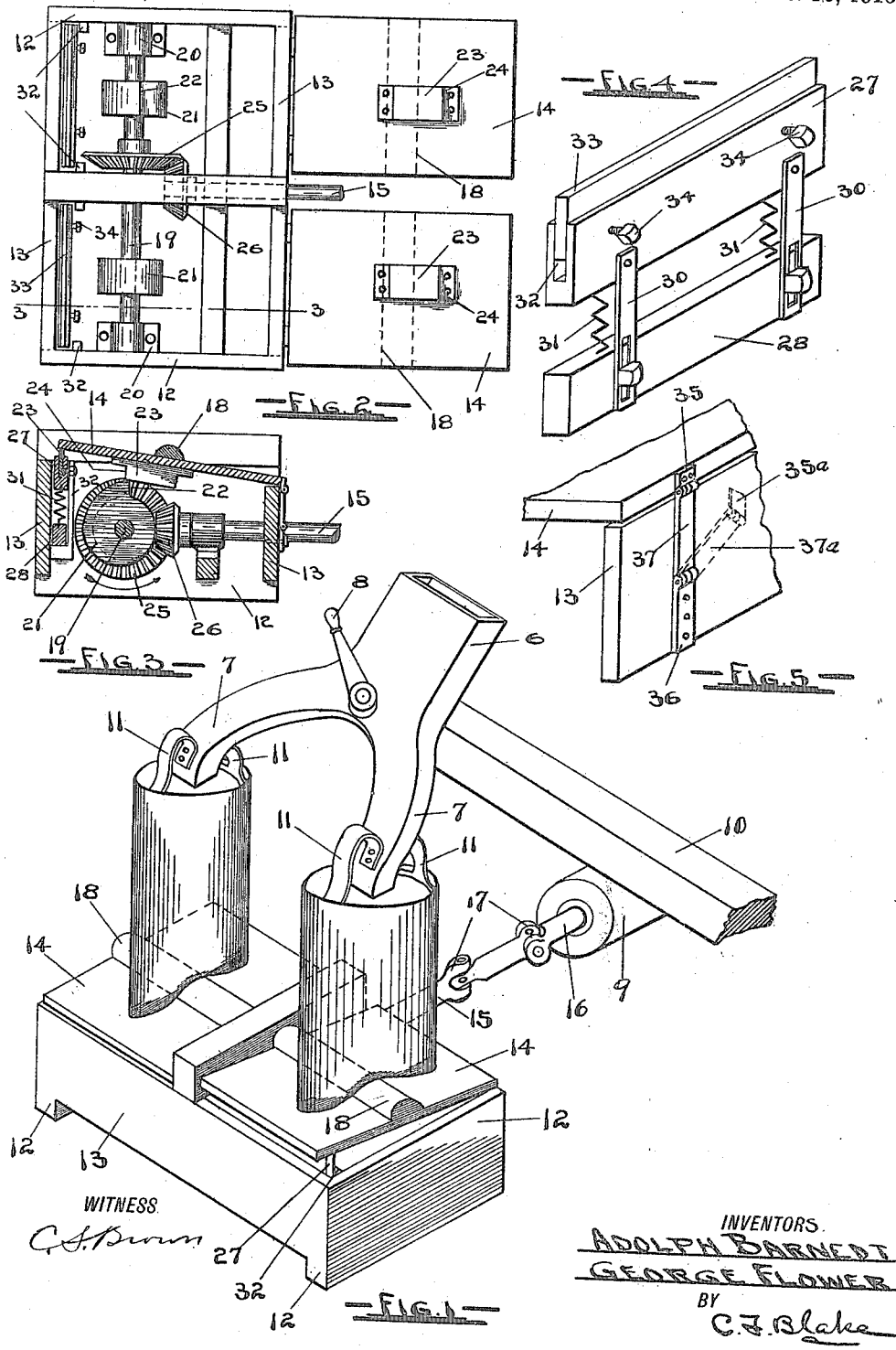
INVENTORS
ADOLPH BARNEDT
GEORGE FLOWER
BY
C. F. Blake
ATTORNEY

UNITED STATES PATENT OFFICE.

ADOLPH BARNEDT AND GEORGE FLOWER, OF BICKLETON, WASHINGTON.

SACK-JIGGER.

1,207,835.            Specification of Letters Patent.        Patented Dec. 12, 1916.

Application filed July 29, 1916.   Serial No. 112,136.

*To all whom it may concern:*

Be it known that we, ADOLPH BARNEDT and GEORGE FLOWER, citizens of the United States, residing at Bickleton, county of Klickitat, State of Washington, have invented certain new and useful Improvements in Sack-Jiggers, of which the following is a specification.

Our invention relates to sack jiggers in general, and particularly to devices used to jig sacks while being filled with grain from a threshing machine, for the purpose of shaking the grain well down into the sack and thus completely filling the sack and packing the grain therein.

We accomplish the above result by means of the construction illustrated in the drawing accompanying this application, and forming part thereof, and in which:—

Figure 1 is a perspective view of our device in use, and also showing such portions of a threshing machine as necessary to illustrate the operation of the device. Fig. 2 is a plan view of our device with the covers thrown back. Fig. 3 is a sectional elevation on the line 3—3 of Fig. 2, and showing the cover in position for operation. Fig. 4 is a detail perspective view of the spring buffer. Fig. 5 is a detail perspective view of one of the cover hinges.

Like characters of reference indicate like parts throughout the several views.

In Fig. 1 the main grain spout of the threshing machine is indicated by 6, and the branch spouts by 7, there being a directing valve the handle of which is indicated by 8; the grain auger box of the threshing machine is indicated by 9, and one of the sills by 10, all of which is part of the threshing machine, and is included herewith for purposes of illustration only. The sacks to be filled are suspended from the spouts 7 by means of spring clips 11 in the ordinary manner now extant. Our device is placed immediately below said sacks, and is so adjusted that the sacks may rest upon the device when being filled, and thus relieve the spring clips 11 of substantially all the weight of the filled sacks.

In general our device consists of a box like structure having ends 12 and sides 13, the ends projecting downward somewhat below the sides, as shown in Figs. 1 and 3, covers 14 hinged to one of said sides 13 and adapted to support the sacks, and an operating shaft 15 adapted to be connected to the thresher auger shaft 16 by any convenient and suitable means, as by the knuckle joints shown in Fig. 1.

During the filling of the sacks the covers 14 are vertically vibrated more or less rapidly, which shakes the grain down and packs it tightly into the sacks. In order that the grain may be packed well into the corners of the sacks, each cover is provided with a saddle or cleat 18 transversely secured thereon, over which the sack is placed to be filled, and which causes the bottom of the sack to incline from the center toward each corner, as illustrated in Fig. 1. In order to vibrate said cover 14 we provide a transverse shaft 19 journaled upon bearings 20 within the box, and having secured thereon cams 21, said cams as illustrated being logarithmic spirals with a substantially radial surface 22 connecting the ends thereof. Each cover 14 is provided with a wearing piece 23 secured thereto and adapted to ride upon the peripheral face of the corresponding cam 21, as shown in Fig. 3. As the cam 21 revolves, the cover 14 is thereby forced upward until the face 22 of the cam alines with the face 24 of the corresponding wearing piece 23, when the cover 14 falls back into its initial position, thus jarring the sack thereon and causing the grain therein to pack. Shaft 19 is connected to shaft 15 by means of bevel gears 25 and 26, and is thereby operated from the auger shaft 16 of the threshing machine, as illustrated in Fig. 1.

In order that the jarring of the sacks may not be too severe we provide a buffer upon which the cover 14 strikes and comes to rest momentarily upon its descent. Said buffer is illustrated in Figs. 3 and 4, and consists of a frame having an upper member 27 and a lower member 28, these being movably connected by means of slotted bars 30, and held apart by means of springs 31. Said buffers are each disposed within suitable guides 32 immediately within the front of the box, and are adjusted so that the upper edge of member 27 is slightly below the lower surface of the corresponding cover 14 when said cover is at the uppermost point of its travel. By this means the severity of the jar is always proportional to the amount of filling contained within the sack, because when only partially filled and therefore of light weight the springs 31 will only be slightly compressed by contact with the cover, while when the sack is more fully filled the greater weight thereof causes more compression of the springs.

As a means of conveniently adjusting the height of the member 27, we provide in the upper edge thereof a longitudinal groove 32 within which is a bar 33 which may be vertically adjusted and then secured by means of set screws 34. In order to prevent damage should the shaft 19 be rotated in the wrong direction, thus causing the cam surfaces 22 to contact with surface 24 of the wearing piece 23, we provide that the corresponding cover may then move backward, which we accomplish by means of the double hinge illustrated in Fig. 5. The upper member 35 of this hinge is secured to the cover, the lower member 36 is secured to the box, and the intermediate member 37 is pivotally connected to members 35 and 36. This construction allows members 35 and 37 to move outward, as at 35ᵃ and 37ᵃ, should the cover be forced backward by the accidental reversal of motion of shaft 19.

Our invention may be made of any size and constructed of any material deemed convenient and suitable for a device of this character, and while we have illustrated and described a form of construction and arrangement of parts found desirable in materializing our invention, we wish to include in this application for Letters Patent all mechanical equivalents or substitutes that may fairly be considered to come within the scope and purview of our invention as devised in the appended claims.

Having disclosed our invention so that others skilled in the art may be enabled to construct and use same, what we claim as new and desire to secure by Letters Patent is;—

1. A sack jigging device comprising a box like frame; a shaft rotatably mounted transversely within said frame; cams upon said shaft; covers pivotally mounted upon one side of said frame; spring buffers mounted within said frame and adapted to coact with said covers; cam seats upon said covers adapted to coact with said cams to impart a reciprocating motion to said covers; means whereby said covers may be rearwardly movable to allow for accidental reversal of motion of said shaft; and means to drive said shaft from some source of power outside of said frame.

2. In a sack jigger comprising a frame, a vertically reciprocating member upon said frame, and means to operate said reciprocating member; means whereby said reciprocating member may be rearwardly movable in case said operating means is accidentally reversed in direction of motion.

3. In a sack jigging device having a frame, a reciprocating member, and a cam shaft coacting with said reciprocating member; a hinge adapted to pivotally mount said reciprocating member upon said frame and to allow said reciprocating member a rearward motion upon reversal of motion of said shaft, said hinge comprising a member secured to said frame, a member secured to said reciprocating member, and a member intermediate said previously mentioned hinge members and pivotally attached to each thereof.

4. In a sack jigging device; a frame; horizontally disposed covers pivotally attached at one edge thereof to said frame; a spring buffer within said frame and adapted to contact with said covers at the edge thereof opposite that pivotally attached to said frame; and means within said frame to impart to said covers a vertical reciprocating motion.

5. In a sack jigging device; a frame; covers pivotally attached to said frame; saddles upon said covers; spring buffers within said frame; a shaft journaled within said frame; cams upon said shaft; and means to operate said shaft.

6. In a sack jigging device having a frame and a reciprocating member mounted upon said frame; a shock absorbing member comprising a pair of substantially parallel bars mounted in guide-ways within said frame, springs intermediate said bars, and means upon one of said bars to adjust the height of the upper edge thereof.

7. In a sack jigging device having a frame and a reciprocating member mounted thereon; a shock absorbing member comprising a lower bar mounted in guide-ways within said frame, an upper bar disposed substantially parallel to said lower bar, springs intermediate said upper and said lower bars adapted to keep the same spaced apart, guides secured to one of said bars and transversely slidable upon the other of said bars, an edge loosely mounted upon the upper portion of said upper bar, and means to adjust and to secure said edge member in place.

In witness whereof we claim the foregoing as our own we hereunto set our respective signatures in the presence of two subscribing witnesses, at Bickleton, county of Klickitat, State of Washington, this 30th day of June 1916.

ADOLPH BARNEDT.
GEORGE FLOWER.

Witnesses:
WILL G. FAULKNER,
A. D. MASON.